No. 770,257. PATENTED SEPT. 20, 1904.
E. J. BROOKS.
SEAL FOR SCREW NUTS OR THE LIKE.
APPLICATION FILED JUNE 1, 1904.
NO MODEL.
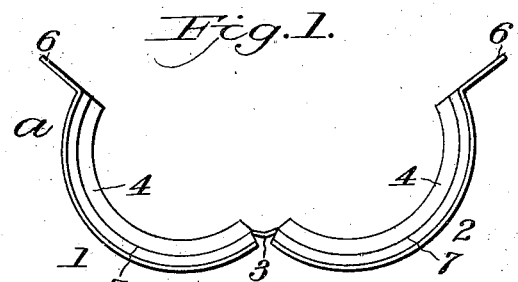
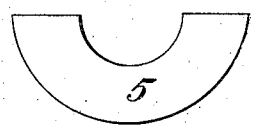
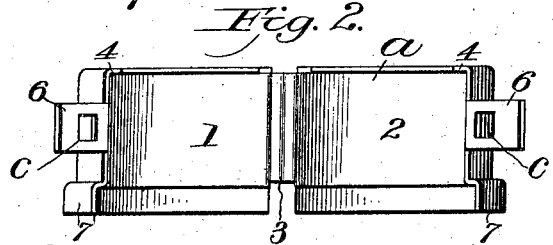
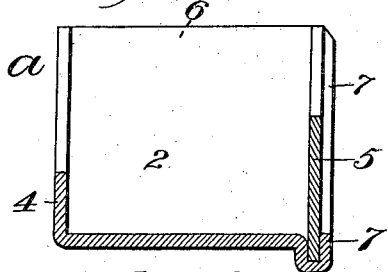
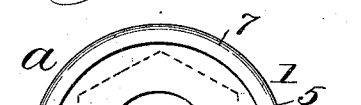
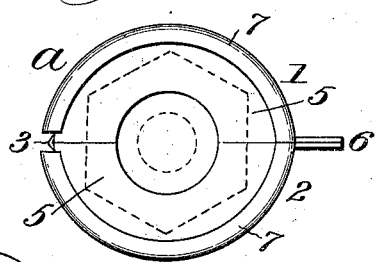
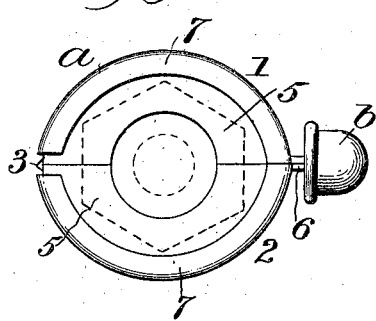
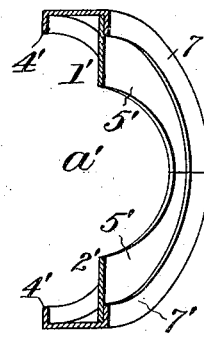
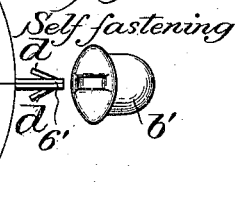
Witnesses
C. H. Walker.
E. Thos. Loftus
Inventor
Edward J. Brooks
by
Attorney.

No. 770,257.

Patented September 20, 1904.

UNITED STATES PATENT OFFICE.

EDWARD J. BROOKS, OF EAST ORANGE, NEW JERSEY.

SEAL FOR SCREW-NUTS OR THE LIKE.

SPECIFICATION forming part of Letters Patent No. 770,257, dated September 20, 1904.

Application filed June 1, 1904. Serial No. 210,749. (No model.)

*To all whom it may concern:*

Be it known that I, EDWARD J. BROOKS, a citizen of the United States of America, and a resident of East Orange, in the State of New Jersey, have invented a new and useful Improvement in Seals for Screw-Nuts or the Like, of which the following is a specification.

This invention relates to means for sealing screw nuts or bolts on meters and other apparatus liable to be tampered with, so as to insure the detection of any such tampering or any attempt to tamper with the apparatus. Like means are applicable to securing joints in such apparatus and for other like purposes.

The present invention consists in a novel device for so sealing screw-nuts and the like adapted to be made wholly or mainly of sheet metal and of peculiar construction, as hereinafter set forth and claimed.

The objects of the invention are to render the device inexpensive and at the same time secure, to facilitate its application to a screw-nut or the like so that this operation may be quickly performed, to adapt it to be destroyed in the act of removing it, and, more particularly, to provide for making the device of any required size without the employment of the ductile sheet metal that would naturally be required for making seals of the larger sizes.

A sheet of drawings accompanies this specification as part thereof.

Figures 1 and 2 are edge views at right angles to each other of the main shackle-piece of an improved seal as it leaves the dies. Figs. 3 and 4 are views corresponding with Figs. 1 and 2, respectively, of one of two similar pieces that are inserted in making the seal. Fig. 5 is an edge view similar to Fig. 1, showing said inserted pieces in place. Fig. 6 is a magnified cross-section on the line A A, Fig. 5. Fig. 7 is an elevation of the shackle closed upon a screw-nut, which is represented by dotted lines. Fig. 8 is an elevation of the same with a self-fastening seal part added to complete the seal, and Fig. 9 is a fragmentary view illustrating modifications.

Like reference letters and numbers indicate like parts in all the figures.

In either of its forms the main member or "shackle," as it is herein termed, (shown at $a$ or $a'$,) comprises a pair of semi-annular body portions 1 and 2 or 1' and 2', permanently united with each other at adjoining sides by a hinge portion 3, integral with said body portions, and said body portions are constructed with inwardly-projecting displacement-preventing flanges 4 and 5 or 4' and 5' to interlock with the respective ends of a screw-nut or the like embraced by said body portions and with a pair of lugs or shackle ends 6 or 6', integral with said body portions, adapted to be brought together in the act of closing the shackle and adapted to interact with a suitable seal part $b$ or $b'$ for permanently fastening the shackle and the seal as a whole in place. Said body portions 1 and 2 or 1' and 2' are so shaped as to form an oval body when closed as nearly round as can be readily formed by two portions stamped out of a suitable grade of tin-plate. This grade should be sufficiently brittle to preclude repeated bending and at the same time ductile enough to permit the hinge portion 3 to bend once with certainty in closing the shackle. To facilitate employing such grade of tin-plate in making seals of any required size, the three-part construction of the shackle member $a$ illustrated by the drawings is preferred. In the species represented by Figs. 1 to 8, inclusive, the displacement-preventing flanges 4 at what may be termed the "back" of the shackle are integral with the respective body portions 1 and 2, while those at the front of the shackle (shown at 5) are formed by inserted semi-annular parts of the shape represented by Figs. 3 and 4, held in place by attaching-flanges 7 integral with the body portions 1 and 2 and formed thereon, as shown in Figs. 1 and 2. Said attaching-flanges 7 are tightly closed around the curved edges of said inserted parts and serve to permanently unite them with the body portions to form said flanges 5, as shown in Figs. 5 and 6. Flanges 5 at the front, of any required depth, may thus be readily inserted in the body portions 1 and 2 of a main shackle part of a very brittle and cheap grade of tin-plate, for which a more ductile and correspondingly expensive grade would otherwise have to be substituted. Such inserted pieces 5 may also facilitate providing the shackle part with any required lettering or distinguishing marks, such as serial numbers, and they may be made of transparent celluloid or the like or of stiff paper instead of sheet metal, if preferred.

In the species represented by Fig. 9 the shackle part $a'$ has rear and front flanges 4' and 7' of one and the same form and depth integral with each of the body portions 1' and 2', and relatively wide displacement-preventing flanges are formed in front by inserted pieces 5', as required in very large seals for meter-dials and the like. Such inserted pieces 5' may be made fast, if desired, by riveting or eyeleting them to the integral front flanges 7'. This species also illustrates making the long axis of the body at right angles to the plane of the joint between the two body portions.

The shackle ends may be adapted to interact with the seal part in any known or improved manner. In the species represented by Figs. 1 to 8 the shackle ends 6 are provided with holes $c$, Fig. 2, and are otherwise adapted to interact with a self-fastening seal part $b$, as in Fig. 8, such seal part being provided internally with suitable snap-catches, as set forth, for example, in my specification forming part of Patent No. 712,250, dated October 28, 1902, or any of the previous specifications therein referred to. In Fig. 9 I have shown the shackle ends 6' provided with oppositely-projecting snap-catches $d$ integral therewith to interlock with a hollow seal part $b'$ in the manner set forth in my specification forming part of Patent No. 673,996, dated May 14, 1901.

A press-fastened sheet-metal seal part, as set forth in my specification forming part of Patent No. 750,020, dated January 19, 1904, and the previous specification therein referred to, or an ordinary sealing-rivet may obviously be substituted in either species for the seal part above described, and other like modifications will suggest themselves to those skilled in the art.

Having thus described said improvement, I claim as my invention and desire to patent under this specification—

A seal for screw-nuts or the like comprising a pair of semi-annular sheet-metal portions permanently united with each other at adjoining sides by a hinge portion integral with said body portions, and constructed with inwardly-projecting displacement-preventing flanges at one edge and with attaching-flanges at the opposite edge integral with said body portions, displacement-preventing flanges of any required depth formed by inserted semi-annular parts held in place by said attaching-flanges, a pair of shackle ends integral with said body portions adapted to be brought together in the act of closing the seal, and a seal part whereby said shackle ends are permanently fastened together and the seal as a whole is securely held in place, substantially as specified.

EDWARD J. BROOKS.

Witnesses:
M. E. KANALEY,
THEODORE D. GOTTLIEB.